UNITED STATES PATENT OFFICE.

VIGGO VALDEMAR JULIUS ANDRESEN, OF COPENHAGEN, DENMARK.

METHOD OF MAKING DENTAL CEMENTS.

1,310,901.     Specification of Letters Patent.     Patented July 22, 1919.

No Drawing.     Application filed January 27, 1919. Serial No. 273,268.

*To all whom it may concern:*

Be it known that I, VIGGO VALDEMAR JULIUS ANDRESEN, a subject of the King of Denmark, and residing at Copenhagen, Denmark, have invented certain new and useful Improvements in Methods of Making Dental Cements, of which the following is a specification.

The present invention has reference to improvements in the manufacture of dental cements, and relates more specifically to a method for making a novel hydraulic cement intended for use in dental practice for various purposes, for instance as temporary filling for hollow teeth, or in the case of deciduous teeth of children as a permanent filling, also in the treatment of crowded teeth for separating them, owing to its property to expand to some extent on hardening. The main value of my new cementitious preparation, aside from its purely mechanical stopping action, resides in the fact that it causes local (dentine) anethesia and sterilizes the parts under treatment, without the accompaniment of injurious caustic action.

In carrying out my invention I work up zinc oxid and alum, or substances containing or forming these combinations, with a suitable liquid, for instance water, and I have found that a mixture of not less than 3 parts of zinc oxid with 1 part of alum and enough water to form a paste, will yield a good cement. For enhancing the depth action of the dentine anesthetizing property of such a cement, I may also work up the zinc oxid and the alum with oil of cloves, eugenol, concentrated solution of sulfate of zinc or of chlorid of zinc, phosphoric acid, or with a mixture of two or more of these substances, or with a product of condensation of eugenol and formaldehyde.

The thus prepared more or less plastic cement is then ready for immediate use; it will set slowly when exposed to air, but will harden more quickly in water.

A good mixture is: 45 parts of zinc oxid, 15 parts of burnt alum, and 15 parts of eugenol, oil of cloves, phosphoric acid, sulfate of zinc, or chlorid of zinc.

If for preparing the cement, instead of water, one or more of the other above mentioned fluids are used, it will be found that the mass, when in position in the tooth cavity, will take up saliva and then expand to some degree during hardening.

In further enlargement of my invention I may admix to the zinc oxid and the alum a product of condensation of eugenol and formaldehyde, in which case I first heat about 2 parts of formaldehyde and about 15 parts of eugenol to about 120° C. when condensation will take place, and then combine the resulting product of condensation with about 45 parts of zinc oxid and about 15 parts of burnt alum.

What I claim is:—

1. The method of making a dental cement, which consists in working up zinc oxid and alum with a liquid or fluid to form a paste.

2. The method of making a dental cement, which consists in working up about 3 parts of zinc oxid, 1 part of burnt alum, and 1½ parts of water.

3. The method of making a dental cement, which consists of working up into a paste, zinc oxid, alum and a substance enhancing the anesthetizing depth action.

4. The method of making a dental cement, which consists in working up into a paste, about 45 parts of zinc oxid, 15 parts of alum, and 15 parts of a substance enhancing the anesthetizing depth action.

5. The method of making a dental cement, which consists in working up into a paste, zinc oxid, alum, and a product of condensation of eugenol and formaldehyde, in a ratio of 45 : 15 : 15 : 2.

VIGGO VALDEMAR JULIUS ANDRESEN.